Dec. 28, 1937.  F. G. BIRKHEAD  2,103,998
WHEELED COASTER
Filed Feb. 5, 1937
Fig. 1.
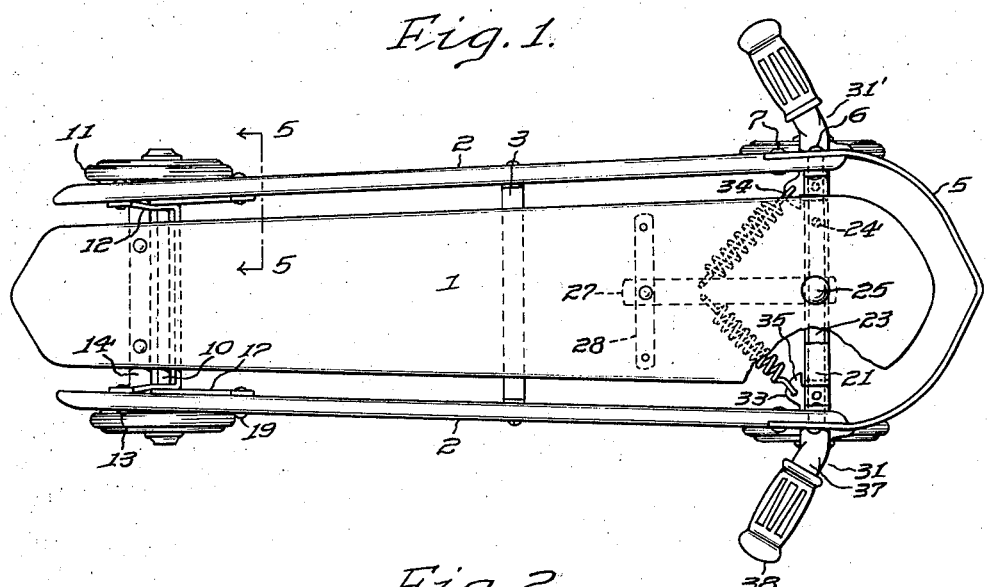
Fig. 2.
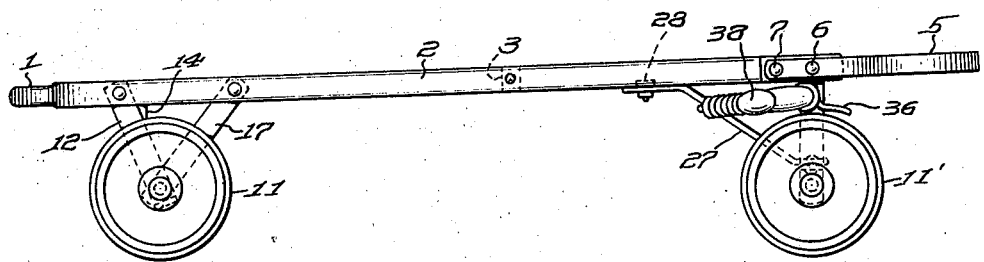
Fig. 3.
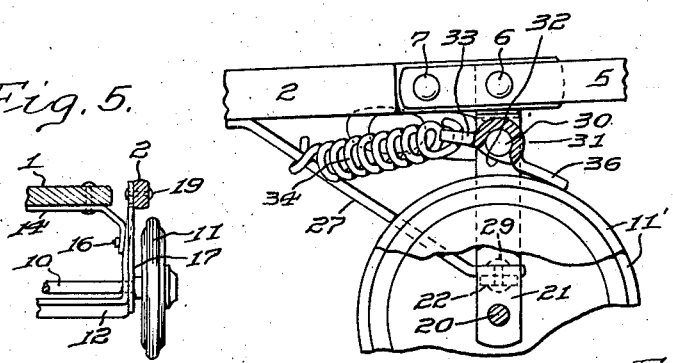
Fig. 4.
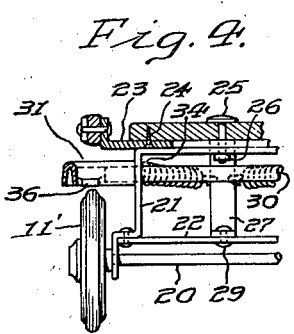
Fig. 5.
INVENTOR
Frank G. Birkhead
BY
ATTORNEY
WITNESS Patented Dec. 28, 1937

2,103,998

UNITED STATES PATENT OFFICE 2,103,998

WHEELED COASTER

Frank G. Birkhead, Philadelphia, Pa., assignor to S. L. Allen & Co., Inc., Philadelphia, Pa., a corporation of Pennsylvania Application February 5, 1937, Serial No. 124,193

9 Claims. (Cl. 280—88)

This invention relates to wheeled coasters and particularly to improvements in steering coasters adapted to be steered by the occupant, while lying prone thereon, through the instrumentality of a generally transverse pivotally arranged steering bar in a manner analogous to a steering sled, the invention being more especially directed to the provision of improved steering and braking mechanism for such coasters.

A principal object of the invention, therefore, is to provide in a steering coaster operating on wheels, as distinguished from the runners of steering sleds, improved steering mechanism in combination with novel braking means whereby steering and braking may be effected either independently or simultaneously with maximum facility, and without impairment of control of the direction of travel during operation of the brake and vice versa, thereby materially enhancing the safety of the occupant and his pleasure in the use of the coaster.

Another object is to provide a steering coaster embodying a brake and yielding means operative both to urge the brake to inoperative position and to urge the steering means to normal or straight line position whereby the simplicity of construction is enhanced and the susceptibility of the coaster to mechanical failure is minimized.

A further object of the invention is to provide in a steering coaster, braking means cooperative with the front wheels thereof and operable to stop or retard the movement of the coaster through suitable manipulation of the means by which its direction of travel is controlled with the result that the coaster can be steered, slowed down or brought to a full stop with utmost facility and without moving either hand from the position it normally occupies when the coaster is in use.

Other objects, purposes and advantages of the invention will hereinafter more fully appear or will be understood from the following description of a coaster embodying one form thereof and illustrated in the accompanying drawing in which Fig. 1 is a top plan view of the coaster with part of the deck broken away to show the subjacent structure;

Fig. 2 is a side elevation thereof;

Fig. 3 is an enlarged fragmentary side elevation of parts of the steering and braking mechanism;

Fig. 4 is a fragmentary front elevation partly in vertical section, and

Fig. 5 is a section on line 5—5 in Fig. 1.

In the several figures like characters are used to designate the same parts.

The coaster as shown comprises a deck 1 formed by a single wooden panel of suitable thickness having its forward end more or less rounded and tapering rearwardly therefrom to its finished-off rear end although it may of course be made of a plurality of slats or in any other suitable manner. Spaced from and paralleling the side edges of the deck are side rails 2 secured together at about their midpoint by a transverse bench 3 on which the deck rests, their front ends being rabbetted to receive the opposite extremities of a bumper 5, spaced from but generally conforming to the forward rounded end of the deck and secured to the side rails by rivets 6, 7.

A rear axle 10 supports at its extremities the rear wheels 11, provided with anti-friction bearings (not shown), and extends through holes in the arms of a U-shaped carrier 12 formed of strip steel, the extremities of its arms being secured to the side rails by rivets 13, and the rear part of the deck is supported from these arms on a rear bench 14 the down-turned ends of which are fastened to the carrier arms by bolts and nuts 16. The rear axle is further braced with respect to the side rails by stays 17 having holes in their lower ends through which the axle extends, while their opposite ends are riveted to the side rails at 19.

The front axle 20, supporting the front of the coaster, is carried on similar wheels 11' but is pivotally attached to the deck to permit the coaster to be steered by turning the axle and hence the front wheels in the desired direction.

To this end a carrier 21 of inverted generally U-shape but having the extremities of its arms offset and provided with holes for the passage of the axle 20 is interposed between the deck and the axle and cross braced by a strip 22 extending parallel to and just above the latter with its ends riveted to the arms. A front bench 23 rests on this carrier and in turn supports the front end of the deck to which it is secured by screws 24 having their heads countersunk in its lower face, the ends of the bench being turned up and held to the side rails by the rivets 6. The upper portion of the carrier, constituting the base of its U, is pivotally secured at its center to the deck and to the bench by a king bolt 25 and nut 26, so that the contacting surfaces of the bench and the carrier constitute a "fifth-wheel" permitting pivotal movement of the axle about the king bolt.

Additional support for the steering assembly is afforded by an angular bracket 27, fastened to a brace 28 and to the deck in rear of the front bench and at its forward end connected to the center of the bracing strip 22 by a pivot pin 29 in axial alignment with the king bolt.

The steering and braking mechanism is mounted on the carrier 21 and comprises a shaft 30 parallel to the front axle extending through the arms of the carrier just above the front wheels and a pair of heads 31, 31' respectively secured to the opposite ends of the shaft. These heads 31, 31' may be made in any suitable way, and thus cast, forged, built up by welding parts together, or, as shown, formed-up from suitable fairly heavy sheet metal blanks, and are of similar construction except for differences necessitated by their opposed positions on the right and left sides of the coaster, so that from a description of but one of them the construction of both will be readily understood by reference to the drawing.

Thus the head 31 on the right hand side of the coaster shown in Fig. 1 comprises a trough into which the end of the shaft 30 extends and in which it is welded, the weld metal 32 as seen in Fig. 3 overlying the shaft between the sides of the trough, and it will of course be evident that at least one of the heads can be attached to the shaft only after the latter has been assembled with the carrier, as otherwise it could not be inserted through the carrier arms.

The head further comprises a rearwardly extending integral lug 33 having a hole through it, and one end of a tension spring 34 is hooked into this hole and its other end into a similar hole in angular bracket 27 in such manner that the spring is under a relatively light tension when the parts are in normal position as shown in Figs. 1, 2 and 4. The two springs 34 on either side of the coaster thus balance each other to keep the carrier at right angles to the longitudinal center line of the deck except when it is positively turned about the king bolt to extend one or the other, and also cooperate to yieldingly resist movement of shaft 30 about its own axis. The extent of such rotation of the shaft from normal position against the force of the springs is moreover limited in one direction to a relatively small arc by a stop 35 projecting inwardly from lug 33 in such way as to overlie the adjacent arm of carrier 21 and engage its edge as the head moves with the shaft about the axis of the latter.

The head is also provided with an integral brake shoe 36 projecting forwardly in the plane of the adjacent wheel and so formed that its under surface affords a fairly large area for contact with the rim of the wheel when the shaft 30 and head 31 are rotated in the opposite or brake-applying direction so as to bring the shoe against it. Thus, if, as is preferable, the wheels are provided with rubber tires, this rotation of the shaft brings both brake shoes into contact with the adjacent tires as shown in Fig. 3, permitting sufficient friction to be set up by the application of only a moderate force to quickly stop the coaster, less force of course being required merely to retard it. Obviously stop 35 is so arranged with relation to the brake shoe as not to interfere with proper application of the brake, and is therefore in practice effective to limit rotation of the head in the brake-releasing direction only, and by thus keeping each brake shoe always fairly close to its wheel it insures that but relatively little movement of the head is required to apply the brakes at any time.

Each head also comprises an outwardly and preferably angularly rearwardly projecting part 37 forming a handle, and rotation of the heads and shaft about the axis of the latter to apply the brakes, as well as its actuation to move the carrier and front wheels about the king bolt to steer the coaster, is effected through manipulation of these handles which are desirably provided with rubber or other suitable grips 38. Thus the occupant of the coaster, by pulling one grip toward the rear and/or pushing the other grip in the opposite direction can readily turn the front axle about king bolt 25 to steer the coaster in either direction as desired against the force of whichever spring 34 is extended thereby, and this same spring then acts to return the front wheels to normal position when the force applied to the grip or grips is relieved.

The occupant of the coaster normally keeps his hands on the grips and may thus steer it in any desired direction at any time, and he may therefore at any time also readily apply the brakes to retard or stop the coaster merely by an upward movement of the grips to thereby turn the shaft 30 about its axis and press the brake shoes against the front wheels. The springs 34 which are placed under added tension by this movement of course operate to turn the shaft in the opposite direction immediately the upward pull on the grips is relieved, thereby moving the shoes away from the wheels within the limit of rotation of the shaft in this direction as determined by stops 35 contacting the arms of carrier 21.

The necessity of moving either hand or both hands from the steering mechanism in order to apply the brakes is thus eliminated and much quicker braking action can be attained than when a separate brake lever is employed, while through the direct integral connection of the brake shoes with the brake actuating means the risk of brake failure through parting of intervening linkage or the like is eliminated.

My coaster is therefore safer than coasters heretofore suggested which were either provided with no brakes at all or with brakes having actuating mechanism separate from the steering mechanism, while due to its simple but strong and substantial construction, comprising no parts likely to get out of order during normal or even unusually severe use, it affords a maximum of pleasurable enjoyment with a minimum of danger.

The specific embodiment of the invention herein shown and described is to be considered as illustrative only, and not as constituting in any way a limitation or restriction of the invention, the scope of which is defined in the appended claims.

Having thus described my invention, I claim and desire to protect by Letters Patent of the United States:

1. In a wheeled coaster comprising a deck, a front axle and wheels disposed at its opposite ends, a U-shaped carrier rising from the axle and pivoted to the forward part of the deck adjacent its longitudinal center line, means for turning the carrier about its pivot comprising a rotatable shaft extending across the carrier and a head providing a handle secured to each end of the shaft, braking means carried by the heads respectively adapted to engage the wheels when the shaft is rotated in one direction and a pair of oppositely inwardly directed tension springs respectively interposed between the heads and the deck adapted to yieldingly maintain the axle and carrier substantially normal to said center line and to resist rotation of the shaft in said direction.

2. In a wheeled coaster comprising a deck, a front axle and wheels at its ends, a carrier rising from said axle and pivotally secured to the deck, a rotatable shaft extending transversely of the carrier in parallelism with the axle, a brake shoe disposed adjacent each end of the shaft adapted to engage the subjacent wheel, hand grips extending outwardly from the ends of the shaft for turning the shaft about its axis to engage the shoes with the wheels and yielding means interconnected with the shaft and another portion of the coaster tending to constantly resist the turning of the shaft on its axis and also to resist turning of the carrier about its pivot.

3. In a wheeled coaster of the character described, a front axle, wheels carried thereby, a deck, a carrier pivoted thereto and rising from the axle, a rotatable shaft supported from the carrier extending parallel to the axle and terminating adjacent the wheels, a head secured to each end of the shaft comprising a brake shoe aligned of the shaft comprising a brake shoe aligned with the adjacent wheel and a hand grip for moving the shoe into engagement therewith, and yielding means for resisting such movement and for yieldingly maintaining the carrier in predetermined pivotal relation to the deck.

4. In a wheeled coaster of the character described, a front axle, wheels carried thereby, a deck, a carrier pivoted thereto and rising from the axle, a rotatable shaft supported from the carrier extending parallel to the axle and terminating adjacent the wheels, a head secured to each end of the shaft comprising a brake shoe aligned with the adjacent wheel and a hand grip for moving the shoe into engagement therewith, yielding means for resisting both such movement and turning of the carrier on its pivot and a stop movable with the shoe adapted by engagement with the carrier to limit its movement away from the wheel under the influence of said yielding means.

5. In a wheeled coaster comprising a deck, a front bench beneath the deck, a front axle normally parallel with the bench, a generally U-shaped carrier disposed between the axle and the bench and pivoted at its midpoint to the latter and to the deck, a pair of front wheels mounted on the axle, and steering and braking means for said wheels comprising an axially rotatable shaft extending parallel to the axle and supported on the carrier, means carried by the ends of the shaft respectively adapted to engage the subjacent wheels, hand grips extending from the shaft for axially rotating it to cause the braking means to engage the wheels and for swinging it horizontally to turn the carrier about its pivot to steer the coaster and yielding means respectively connected with the shaft adjacent the grips and with another part of the coaster for resisting said rotative and swinging movements of the shaft.

6. In a wheeled coaster comprising a deck, a front axle supported in pivotal relation thereto, a pair of wheels carried by the axle, an axially rotatable shaft extending parallel with the axle and terminating adjacent said wheels operable to swing the axle about its pivot, braking means carried by the ends of the shaft adapted to engage the wheels on rotation of the shaft in one direction, means for manually rotating the shaft in said direction, yielding means resisting said rotation and a stop movable with the shaft operable to limit its rotation in the opposite direction, said yielding means also resisting movement of the shaft to swing the axle pivotally in opposite directions.

7. In a coaster of the class described, a deck, an axle supported in pivotal relation thereto, a horizontally extending axially rotatable shaft for swinging the axle about its pivot, wheels at the ends of the axle, braking means carried by the shaft operable on rotation of the shaft in one direction to engage the wheels to brake the coaster and yielding means respectively connected with the opposite ends of the shaft and another part of the coaster for resisting both rotation of the shaft in said direction and movement thereof horizontally for swinging the axle about its pivot in opposite directions.

8. In a coaster of the class described, a deck, an axle supported in pivotal relation thereto, wheels at the ends of the axle, manually operable means adapted to swing the axle about its pivot to steer the coaster when said means are moved horizontally, braking means associated with said manually operable means adapted to engage said wheels when said manually operable means are moved vertically and yielding means tending to resist horizontal movement of said manually operable means in opposite directions and vertical movement thereof in one direction.

9. In a wheeled coaster comprising a deck, a front axle and front wheels mounted thereon, an inverted generally U-shaped carrier interposed between the front axle and the deck and pivoted to the latter substantially at its midpoint, a brace extending between the arms of the carrier in parallelism with the axle, a bracket secured to the deck in rear of the carrier pivot extending angularly forwardly and downwardly therefrom and pivotally secured to said brace in axial alignment with said carrier pivot, an axially rotatable shaft supported by the carrier in substantial parallelism with the front axle, brake shoes carried by the shaft adjacent its ends respectively operable to engage the front wheels, lugs projecting rearwardly from the shaft adjacent the brake shoes, handle means respectively interconnected with the ends of the shaft operable to turn it axially to actuate the brake shoes and to swing the carrier about its pivotal axis to steer the coaster, and tension springs respectively extending between the lugs and the angular bracket for resisting said turning of the shaft and adapted to normally maintain the carrier and front axle substantially perpendicular to the longitudinal center line of said deck.

FRANK G. BIRKHEAD.